United States Patent
Kim et al.

(10) Patent No.: US 10,800,372 B2
(45) Date of Patent: Oct. 13, 2020

(54) SEAM-SEALED CURTAIN AIRBAG CUSHION

(71) Applicants: IHC Co., Ltd., Seoul (KR); Dual Co., Ltd., Seoul (KR)

(72) Inventors: Sang Kwon Kim, Namyangju-si (KR); Seong Hwan Park, Ulsan (KR)

(73) Assignees: IHC CO., LTD., Seoul (KR); DUAL CO., LTD., Seoul (KR)

( * ) Notice: Subject to any disclaimer, the term of this patent is extended or adjusted under 35 U.S.C. 154(b) by 358 days.

(21) Appl. No.: 15/466,139

(22) Filed: Mar. 22, 2017

(65) Prior Publication Data

US 2018/0251095 A1    Sep. 6, 2018

(30) Foreign Application Priority Data

Mar. 3, 2017   (KR) ........................ 10-2017-0027620

(51) Int. Cl.
 *B60R 21/232*   (2011.01)
 *B60R 21/231*   (2011.01)
 *B60R 21/235*   (2006.01)

(52) U.S. Cl.
 CPC .......... *B60R 21/232* (2013.01); *B60R 21/235* (2013.01); *B60R 21/23138* (2013.01); *B60R 2021/23509* (2013.01); *B60R 2021/23533* (2013.01); *B60R 2021/23576* (2013.01); *B60R 2021/23595* (2013.01)

(58) Field of Classification Search
 None
 See application file for complete search history.

(56) References Cited

U.S. PATENT DOCUMENTS

| | | | | |
|---|---|---|---|---|
| 4,052,521 A * | 10/1977 | Ferrari | ............... | D06M 15/244 118/126 |
| 6,877,768 B2 * | 4/2005 | Fujiwara | ............... | B60R 21/232 280/730.2 |
| 8,851,516 B2 * | 10/2014 | Kwak | ................... | B60R 21/235 112/315 |
| 8,960,714 B2 * | 2/2015 | Kim | ................. | B60R 21/23138 280/730.2 |
| 9,505,368 B2 * | 11/2016 | Morrell | ................. | B60R 21/232 |
| 9,533,652 B1 * | 1/2017 | Paxton | .................. | B60R 21/239 |
| 2008/0085942 A1 * | 4/2008 | Jackson | ............... | C09D 183/04 521/47.5 |
| 2016/0214562 A1 * | 7/2016 | Kalandek | .............. | B60R 21/235 |
| 2017/0232922 A1 * | 8/2017 | Wiik | ................. | B60R 21/23138 280/730.2 |
| 2017/0247012 A1 * | 8/2017 | Low | ....................... | B60R 21/235 |

(Continued)

FOREIGN PATENT DOCUMENTS

JP   2002003690 A   *  1/2002
JP   2005226213 A   *  8/2005

*Primary Examiner* — Nicole T Verley
(74) *Attorney, Agent, or Firm* — Cantor Colburn LLP

(57) ABSTRACT

Provided is a seam-sealed curtain airbag cushion that makes a panel with a fabric to which a silicone coating liquid is applied and doubly couples a first panel and a second panel constituting the panel by means of a silicone sealant and a sewing yarn so as to maintain the internal pressure thereof for a period of time in the event of a side crush or vehicle overturning. The seam-sealed curtain airbag cushion has the improvements in the tensile strength and tearing strength and is not deteriorated in performance even under various external environments.

11 Claims, 6 Drawing Sheets

(56) References Cited

U.S. PATENT DOCUMENTS

2017/0274863 A1* 9/2017 Mihm ................. B60R 21/2346
2018/0065583 A1* 3/2018 Tabushi ............... B60R 21/233
2018/0065587 A1* 3/2018 Maenishi ............. B60R 21/205

* cited by examiner

SEAM-SEALED CURTAIN AIRBAG CUSHION

TECHNICAL FIELD

The present invention relates to a seam-sealed curtain airbag cushion, and more particularly, to a seam-sealed curtain airbag cushion that is attached to the top end of the side surface of the interior of a vehicle in such a manner as to be deployed for a given period of time in the event of a side crush against the vehicle, thereby protecting the passenger in the vehicle from the impact applied from the side crush.

BACKGROUND ART

Generally, a curtain airbag is attached to the top end of the side window in the interior of a vehicle in such a manner as to be deployed at a fast speed in the event of a side crush to especially protect the head or shoulder of a passenger from the side crush. If the impact applied upon the side crush is sensed by an impact sensor of a vehicle body, gas is supplied to the interior of the curtain airbag by means of an inflator connected to the curtain airbag, so that the curtain airbag becomes instantly deployed.

Unlike driver or passenger airbags configured to emit gas just after the deployment so as to ensure the view of the passenger and also to provide the space for his or her escape from the vehicle, the curtain airbag first protects the back seat passenger from the side crush and secondarily maintains the internal gas pressure thereof for several seconds in preparation for vehicle overturning. Accordingly, the fabric of the curtain airbag needs high strength and high heat resistance so as to prevent the curtain airbag itself from being damaged or deformed even if the internal gas pressure is instantly increased, and further, the coupling portion of a panel has to be not broken even under any impact.

In conventional curtain airbag cushions, however, internal gas leaks through the sewn portion after the curtain airbag cushion deploying, so that the internal pressures of the curtain airbag cushions are not maintained to given levels. So as to prevent the internal gas of the curtain airbag cushion from leaking through the gaps formed on the yarn sewn on the fabric, accordingly, the present inventors have made various studies and then found that if a coating liquid is applied to the fabric of the curtain airbag cushion, the airtightness of the fabric is improved, and further, if a sewing portion is formed on a seam-sealed portion, the strength of the seam-sealed portion is increased.

DISCLOSURE

Technical Problem

Accordingly, the present invention has been made in view of the above-mentioned problems occurring in the prior art, and it is an object of the present invention to provide a seam-sealed curtain airbag cushion that is capable of allowing an internal pressure thereof to be kept for a given period of time when a side crush occurs on the side surface of a vehicle or when a vehicle is overturned, thereby protecting the passenger in the vehicle from the side crush or overturning and that is capable of maintaining the performance thereof even under the condition of a high temperature, a low temperature or a high humidity.

Technical Solution

To accomplish the above-mentioned object, according to the present invention, there is provided a seam-sealed curtain airbag cushion including a panel to which a coating liquid is applied, a seam-sealed portion, a sewing portion, and openings, wherein the panel is provided by coupling a first panel and a second panel to each other by means of the seam-sealed portion so that the first panel and the second panel are sewn by means of the sewing portion passing through the seam-sealed portion, the panel being made of a polyamide or polyester fabric, and the openings are adapted to release the stress against the internal pressure of the curtain airbag cushion.

According to the present invention, desirably, the coating liquid is a silicone composition.

According to the present invention, desirably, the fabric of the panel has the elongation of 25 to 65%.

According to the present invention, desirably, the polyester fabric has the grams per square meter of 220 to 300 g/m$^2$, the tensile strength of 180 kgf/in or more, and the tearing strength of 15 kgf or more.

According to the present invention, desirably, the polyamide fabric has the grams per square meter of 190 to 240 g/m$^2$, the tensile strength of 180 kgf/in or more, and the tearing strength of 20 kgf or more.

According to the present invention, desirably, the seam-sealed portion has a silicone sealant, and the sealant has the application width of 8 to 18 mm, the application thickness of 0.5 to 1.2 mm, and the application margin of 3 mm or more.

According to the present invention, desirably, the sewing yarn constituting the sewing portion has the thickness of 1260 D or more.

According to the present invention, desirably, under a room temperature condition, the tensile strength is increased by 150% and the tearing strength is increased by 120%, higher than before the sewing.

According to the present invention, desirably, under a first cycling condition, the tensile strength is increased by 150% and the tearing strength is increased by 120%, higher than before the sewing, and the first cycling condition is as follows: a) Twenty four hours elapse at a temperature of 38° C. and humidity of 95%; b) Twenty four hours elapse at a temperature of 80° C.; c) Six hours elapse at a temperature of 29° C.; and d) The above processes are repeated two times.

According to the present invention, desirably, under a second cycling condition, the tensile strength is increased by 150% and the tearing strength is increased by 120%, higher than before the sewing, and the second cycling condition is as follows: a) Twenty nine hours elapse at a temperature of −40° C.; b) Nineteen hours elapse at a temperature of 22° C. and humidity of 95%; c) Twenty nine hours elapse at a temperature of 107° C.; d) Nineteen hours elapse at a temperature of 22° C. and humidity of 95%; and e) The above processes are repeated two times.

According to the present invention, desirably, under a heating aging condition, the tensile strength is increased by 150% and the tearing strength is increased by 120%, higher than before the sewing, and the heating aging condition is as follows: Four hundred eight hours elapse at a temperature of 108° C.

According to the present invention, desirably, under an ozone condition, the tensile strength is increased by 150% and the tearing strength is increased by 120%, higher than before the sewing, and the ozone condition is as follows: Fourteen days elapse at an ozone gas concentration of 0.5 ppm and a temperature of 38° C.

According to the present invention, desirably, under a humidity condition, the tensile strength is increased by 150% and the tearing strength is increased by 120%, higher than before the sewing, and the humidity condition is as follows: Four hundred eight hours elapse at a temperature of 70° C. and humidity of 95%.

Advantageous Effects

According to the present invention, the seam-sealed curtain airbag cushion is made of the fabric having excellent airtightness and is provided with the sealant and sewing yarn having high strength so that it can constantly maintain the internal pressure thereof, without any damage, when a side crush occurs on the side surface of a vehicle or when a vehicle is overturned, and in addition, it is not deteriorated in performance even under various external environments.

MODE FOR INVENTION

Hereinafter, an explanation on a seam-sealed curtain airbag cushion according to the present invention will be in detail given with reference to the attached drawing.

Figure 1:
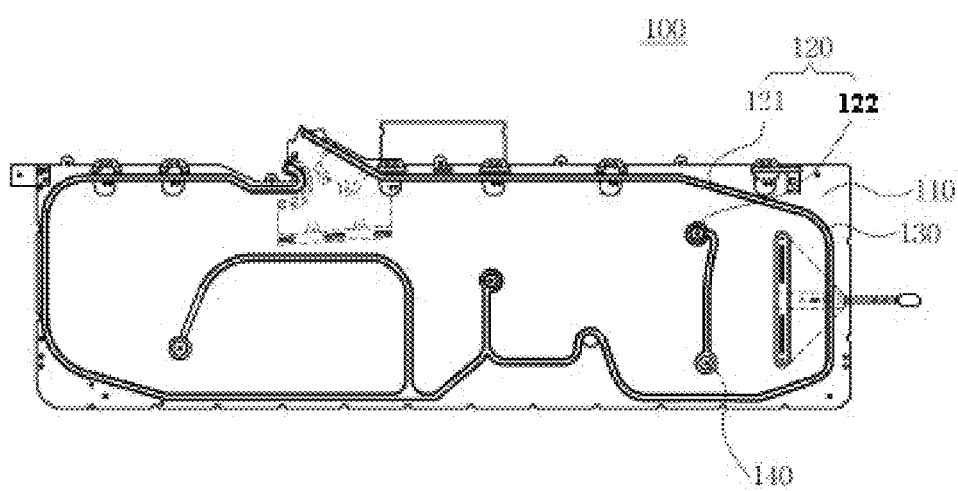
FIG. 1 is a schematic view showing the entire structure of a seam-sealed curtain airbag cushion according to the present invention.

FIG. 1 is a schematic view showing the entire structure of a seam-sealed curtain airbag cushion according to the present invention. As shown in FIG. 1, a seam-sealed curtain airbag cushion 100 according to the present invention includes a panel 110 to which a coating liquid is applied, a seam-sealed portion 120, a sewing portion 130, and openings 140, and the panel 110 is provided by coupling a first panel 111 and a second panel 112 to each other. The seam-sealed portion 120 includes first seam-sealed portions 121 formed by applying a sealant to the edges of the curtain airbag cushion 100 and second seam-sealed portions 122 formed by applying a sealant to a shape of a circle to the inside of the first seam-sealed portion 121.

If the application of a side crush to a vehicle is sensed, an inflator is activated, and through the activation of the inflator, gas is injected into the curtain airbag cushion 100 to permit the curtain airbag cushion 100 to be deployed. The curtain airbag cushion 100 should protect the passengers in the vehicle from the side crush as well as from vehicle overturning. Accordingly, the internal pressure of the curtain airbag cushion 100 has to be maintained for several seconds, but if the curtain airbag cushion is made of a fabric to which no coating liquid is applied, gas leaks from the gaps between a yarn, thereby making it difficult to maintain the internal pressure of the curtain airbag cushion. Therefore, the coating liquid is applied to the surface of the fabric of the curtain airbag cushion 100 to enhance the airtightness of the curtain airbag cushion 100.

The panel 110 is plain woven, and the fabric constituting the panel 110 is made of a polyester or polyamide yarn. The polyester or polyamide yarn has break elongation of 15 to 30%. If the break elongation is less than 15%, the fabric of the curtain airbag cushion 100 may be damaged due to the lack of elasticity upon the deployment of the curtain airbag cushion 100, and contrarily, if the break elongation is more than 30%, the fabric of the curtain airbag cushion 100 may be loose due to excessive elasticity. Further, the fabric of the curtain airbag cushion 100 has a shrinkage rate of 4 to 8% at a high temperature (180° C.), and if the shrinkage rate is less than 4% or more than 8%, the fabric may be seriously deformed according to the internal environment of the curtain airbag cushion 100.

Desirably, the polyester yarn used in the present invention is a polyethylene terephthalate (hereinafter referred to as "PET") yarn. The PET yarn has the thickness of 470 to 590 Dtex. If the thickness of the PET yarn is less than 470 Dtex, the strength of the fabric becomes low due to the lack of the strength of the yarn, thereby making it impossible to satisfy the performance of the curtain airbag cushion 100, and contrarily, if the thickness of the PET yarn is more than 590 Dtex, the weight of the curtain airbag cushion 100 becomes increased, thereby reducing the fuel efficiency of the vehicle.

The polyester fabric, which is woven by the PET yarn and with the coating liquid applied to the surface thereof, has weft and warp densities of 49 to 53 EA/in and grams per square meter of 220 to 300 g/m$^2$. If the grams per square meter are less than 220 g/m$^2$, the strength of the fabric becomes low so that the fabric cannot be used as the fabric of the curtain airbag cushion 100, and contrarily, if the grams per square meter are more than 300 g/m$^2$, the fuel efficiency of the vehicle may be drastically reduced so that the fabric cannot be desirably used as the fabric of the curtain airbag cushion 100.

Further, the polyester fabric has the tensile strength of 180 kgf/in or more and the tearing strength of 15 kgf or more. If the tensile strength of the polyester fabric is less than 180 kgf/in or the tearing strength thereof is less than kgf, the performance required as the curtain airbag cushion 100 cannot be satisfied, thereby failing to protect the passengers in the vehicle from the impact.

On the other hand, the polyamide yarn used in the present invention is a nylon 6 yarn, and desirably, it is a nylon 66 yarn. The nylon 66 yarn has the thickness of 470 to 500 Dtex. If the thickness of the nylon 66 yarn is less than 470 Dtex, the strength of the fabric becomes low, thereby making it impossible to satisfy the performance of the curtain airbag cushion 100 as required, and contrarily, if the thickness of the nylon 66 yarn is more than 500 Dtex, the weight of the curtain airbag cushion 100 becomes increased, thereby reducing the fuel efficiency of the vehicle.

The polyamide fabric, which is woven by the nylon 66 yarn and with the coating liquid applied to the surface thereof, has weft and warp densities of 44 to 48 EA/in and grams per square meter of 190 to 240 g/m$^2$. If the grams per square meter are less than 190 g/m$^2$, the strength of the fabric becomes seriously low so that the fabric cannot be used as the fabric of the curtain airbag cushion 100, and contrarily, if the grams per square meter are more than 240 g/m$^2$, the fuel efficiency of the vehicle may be drastically reduced so that the fabric cannot be desirably used as the fabric of the curtain airbag cushion 100.

Further, the polyamide fabric has the tensile strength of 180 kgf/in or more and the tearing strength of 20 kgf or more. If the tensile strength of the polyamide fabric is less than 180 kgf/in or the tearing strength thereof is less than 20 kgf, the performance required as the curtain airbag cushion 100 cannot be satisfied, thereby failing to protect the passengers in the vehicle from the impact.

The fabric of the curtain airbag cushion 100 has elongation of 20 to 65%, and if the elongation is less than 20% or more than 65% to cause the elasticity to be seriously decreased or increased, the performance of the curtain airbag cushion 100 may be deteriorated. Since the nylon 66 yarn has higher elongation than the PET yarn, especially, the elongated volume of the PET yarn is relatively smaller than that of the nylon 66 yarn under the same external conditions as each other. According to the characteristics of the PET fabric, if the fabric of the curtain airbag cushion 100 is made of the PET yarn, the internal pressure of the curtain airbag cushion 100 is higher than that of the curtain airbag cushion 100 made of the nylon 66 yarn.

Figure 2A:
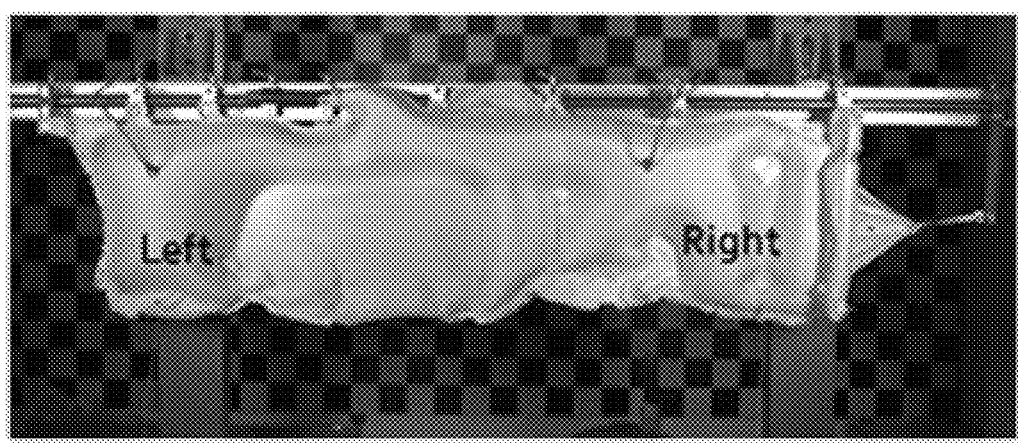
FIG. 2a is a photograph showing the deployed state of the seam-sealed curtain airbag cushion according to the present invention.
Figure 2B:
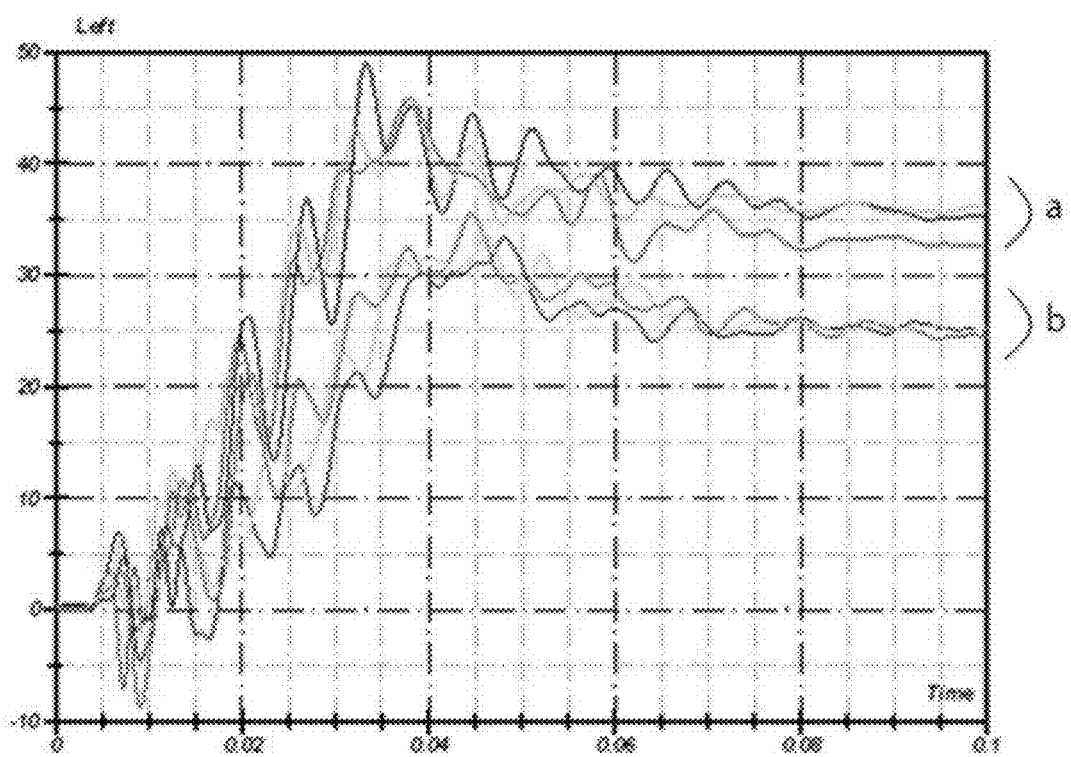
FIG. 2b is a graph showing the comparison between the internal pressure in the left side portion of a seam-sealed curtain airbag cushion made of a PET fabric and the internal pressure in the left side portion of a curtain airbag cushion made of a nylon 66 fabric.
Figure 2C:
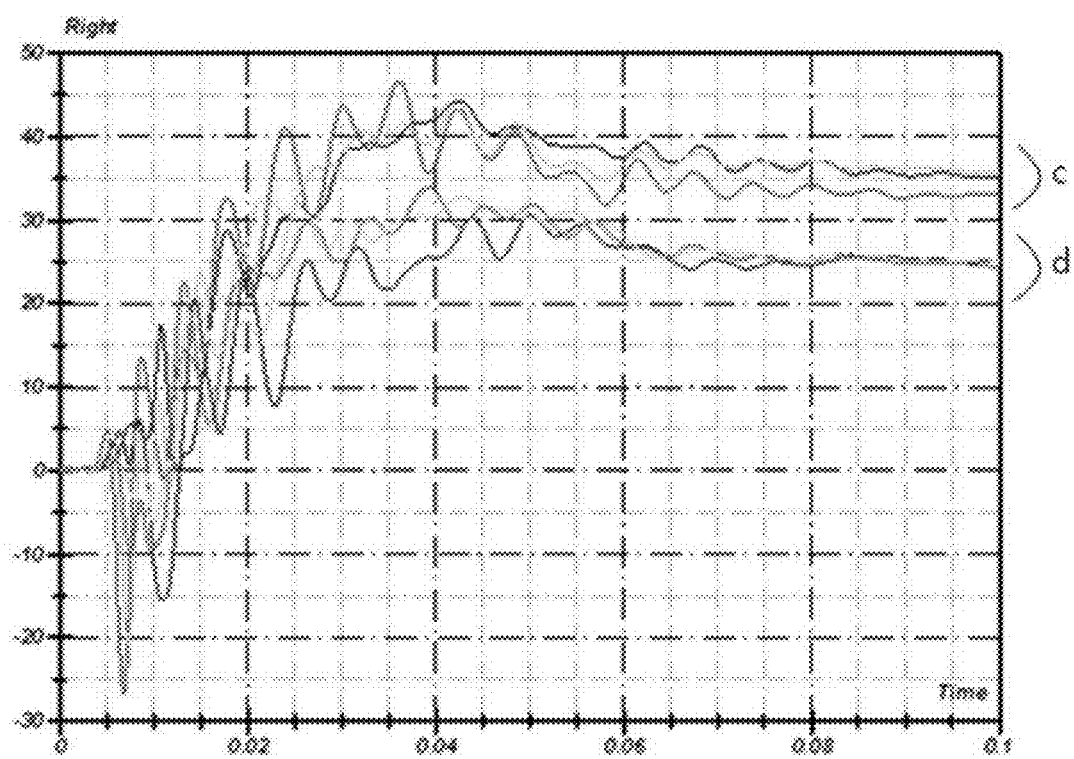
FIG. 2c is a graph showing the comparison between the internal pressure in the right side portion of the seam-sealed curtain airbag cushion made of the PET fabric and the internal pressure in the right side portion of the curtain airbag cushion made of the nylon 66 fabric.

FIG. 2a shows the state wherein the curtain airbag cushion 100 is deployed, and for the convenience of explanation, the portion of the curtain airbag cushion 100 attached to the front side of the vehicle is defined as a left side portion, and the portion thereof attached to the rear side of the vehicle is as a right side portion. In FIG. 2b, 'a' designates the variations of the internal pressure of the left side portion of the curtain airbag cushion 100 made of the PET fabric, and 'b' designates the variations of the internal pressure of the left side portion of the curtain airbag cushion 100 made of the nylon 66 fabric. In FIG. 2c, further, 'c' designates the variations of the internal pressure of the right side portion of the curtain airbag cushion 100 made of the PET fabric, and 'd' designates the variations of the internal pressure of the right side portion of the curtain airbag cushion 100 made of the nylon 66 fabric. Before the internal pressures reach the highest points, the increment speeds of the internal pressures are similar to each other irrespective of the kinds of the fabrics, but after they reach the highest points, it is appreciated that the internal pressure of the curtain airbag cushion 100 made of the PET fabric is kept higher than that made of the nylon 66 fabric.

Figure 2D:
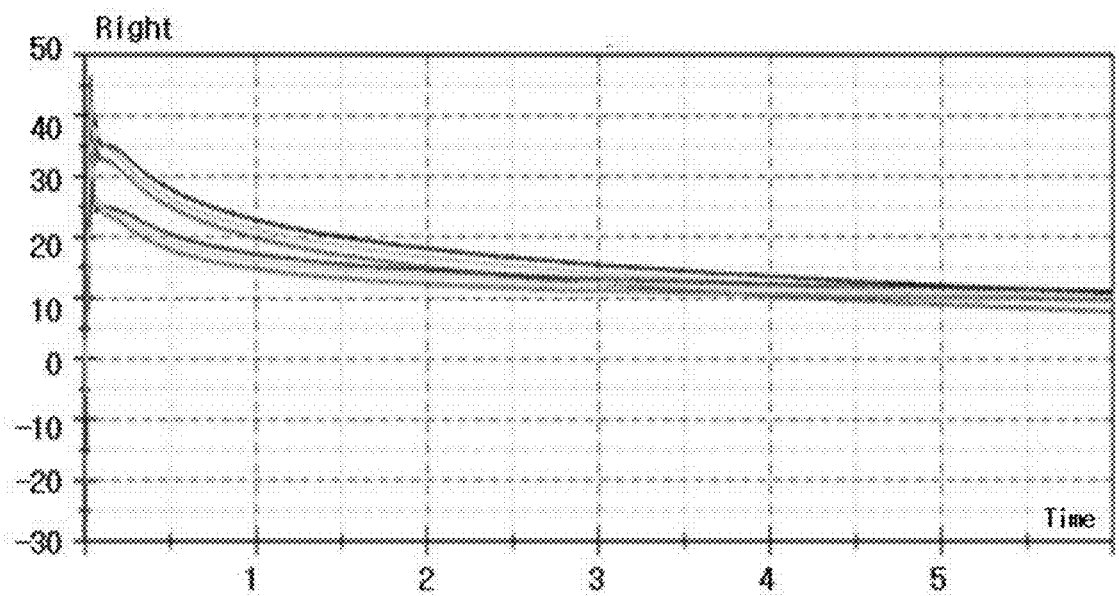
FIG. 2d is a graph showing the comparison, after a given period of time is passed, between the internal pressure in the right side portion of the seam-sealed curtain airbag cushion made of the PET fabric and the internal pressure in the right side portion of the curtain airbag cushion made of the nylon 66 fabric.

FIG. 2d is a graph showing the comparison, after a given period of time from the deployment of the curtain airbag cushion 100 is passed, between the internal pressure in the right side portion of the seam-sealed curtain airbag cushion made of the PET fabric and the internal pressure in the right side portion of the curtain airbag cushion made of the nylon 66 fabric. At an initial step, the internal pressure of the curtain airbag cushion 100 made of the PET fabric is higher than that made of the nylon 66 fabric, but after six seconds are passed, their internal pressures are similar to each other due to the leakage of their internal gas.

The coating liquid contains silicone rubber and has the break elongation of 180% or more, tensile strength of 3.0 MPA or more, tearing strength of 4.0 KN/m, and hardness of 30 or more. While the coating liquid is being applied to the surface of the fabric, it is filled in the gaps between the yarn to enhance the airtightness of the curtain airbag cushion 100, and the air permeability of the fabric of the curtain airbag cushion 100 after the application of the coating liquid is 0.15 cfm or under.

A method for applying the coating liquid to the surface of the fabric of the curtain airbag cushion 100 may be carried out by means of well-known methods. For example, the method may be carried out by means of air knife coating, comma coating, roll coating, dip coating, spray coating, and the like. Particularly, the air knife coating is carried out wherein a relatively thin film is formed on the surface of the fabric so that the invasion of the coating liquid into the fabric is suppressed and soft coating bubbles are desirably formed.

A sealant for seam-sealing is applied to the fabric of the curtain airbag cushion 100, and after that, the sealant is left at a room temperature for 12 hours or more so that it is cured. The sealant is a substance containing silicone and has the density of 1 to 1.5 g/cm$^3$, tensile strength of 35.69 kgf or more, and elongation of 1050% or more.

The sealant is applied to the panel 110 to the width of 8 to 18 mm. If the application width of the sealant is deviated from the above-mentioned range, the application thickness of the sealant is seriously increased or decreased to cause the curtain airbag cushion 100 to be damaged upon the deployment thereof. Accordingly, the application thickness of the sealant has to be maintained in the range of 0.5 to 1.2 mm.

The grams per square meter of the applied sealant are in the range of 0.061 to 0.147 g/cm$^2$. If the grams per square meter of the applied sealant are less than 0.061 g/cm$^2$, the adhesion force of the sealant is decreased to cause gas leakage upon the deployment of the curtain airbag cushion 100, and contrarily, if the grams per square meter of the applied sealant are more than 0.147 g/cm$^2$, undesirably, the time for curing the sealant is excessively consumed.

Figure 3A:
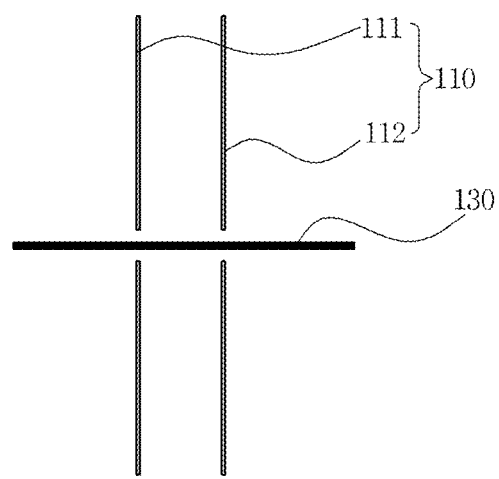
FIG. 3a is a schematic view showing the state wherein gas leaks from the interior of the curtain airbag cushion through sewing holes formed by the sewing line for coupling a first panel and a second panel.
Figure 3B:
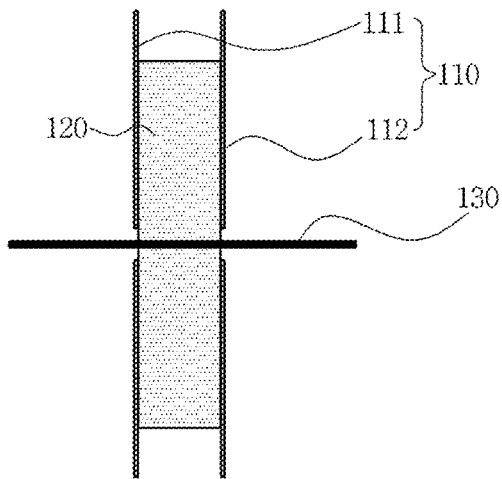
FIG. 3b is a schematic view showing the state wherein the sewing holes are separated from the interior of the curtain airbag cushion according to the present invention through a seam-sealed portion.
Figure 4:
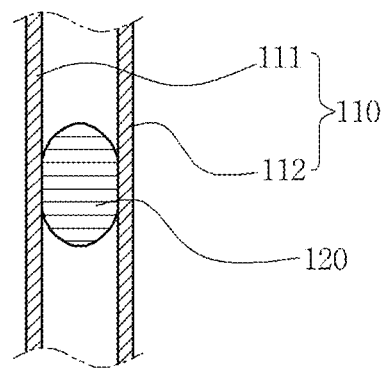
FIG. 4 is a schematic view showing the application width and thickness of a silicone sealant constituting the seam-sealed portion.

After the sealant has been applied to the curtain airbag cushion 100, the first panel 111 and the second panel 113 are attached to each other, and then, the fabric of the curtain airbag cushion 100 is sewn by passing the seam-sealed portion 120 between the first panel 111 and the second panel 113. As shown in FIG. 3a, if the first panel 111 and the second panel 113 are coupled to each other by means of only a sewing yarn, without any seam-sealing portion 120, the internal gas of the curtain airbag cushion 100 may leak through the holes formed by the sewing, but according to the present invention (as shown in FIG. 3b), the holes formed by the sewing are separated from the interior of the curtain airbag cushion 100 by means of the silicone sealant, thereby causing no gas leakage.

If the thickness of the sewing yarn is less than 1260 D, the sewing yarn may be damaged upon the deployment of the curtain airbag cushion 100, so that it is desirable that the thickness of the sewing yarn is more than 1260 D. Further, the sewing yarn has the stitch number per 25 mm of 9 to 15

Figure 5:
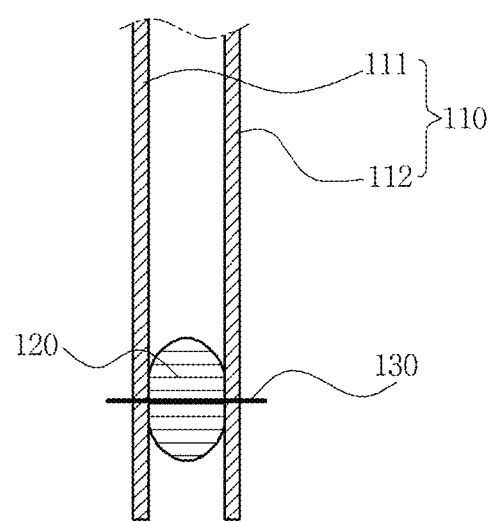
FIG. 5 is a schematic view showing the application margin of the silicone sealant.

EA and the application margin of 3 mm or more (See FIG. 5). The application margin used in the present invention means the distance from the end of the applied sealant to the point through which the sewing yarn is passed, and if the application margin is less than 3 mm, the function of the sealant is not exerted upon the deployment of the curtain airbag cushion 100, thereby causing the gas leakage from the sewn portion.

On the other hand, the first panel 111 and the second panel 112 are coupled to each other by means of the sealant and the sewing yarn, thereby increasing the tensile strength and the tearing strength of the fabric of the curtain airbag cushion 100. In more detail, when the strengths of the seam-sealed portion 120 before and after the sewing are compared with each other, after the sewing the tensile strength of the seam-sealed portion 120 is increased by 150% and the tearing strength thereof is increased by 120%, higher than before the sewing, under the conditions of a room temperature, cycling, heat aging, ozone and humidity. The cycling condition is applied by selecting any one of a first cycling condition and a second cycling condition as will be mentioned below.

[First Cycling Condition]
  a) Twenty four hours elapse at a temperature of 38° C. and humidity of 95%
  b) Twenty four hours elapse at a temperature of 80° C.
  c) Six hours elapse at a temperature of 29° C.
  d) The above processes are repeated two times

[Second Cycling Condition]
  a) Twenty nine hours elapse at a temperature of −40° C.
  b) Nineteen hours elapse at a temperature of 22° C. and humidity of 95%
  c) Twenty nine hours elapse at a temperature of 107° C.
  d) Nineteen hours elapse at a temperature of 22° C. and humidity of 95%
  e) The above processes are repeated two times

[Heat Aging Condition]
  Four hundred eight hours elapse at a temperature of 108° C.

[Ozone Condition]
  Fourteen days elapse at an ozone gas concentration of 0.5 ppm and a temperature of 38° C.

[Humidity Condition]
  Four hundred eight hours elapse at a temperature of 70° C. and humidity of 95%

The strength of the seam-sealed portion 120 according to the present invention is more than 18 kgf. If the strength of the seam-sealed portion 120 is less than 18 kgf, the seam-sealed portion 120 is broken due to the momentary pressure increment of the interior of the curtain airbag cushion 100, thereby making it impossible to maintain the internal pressure over a given period of time.

The strength of the fabric of the curtain airbag cushion 100 is maintained even under the conditions of a high temperature and a high humidity, a low temperature, or a high concentration of ozone. Accordingly, the performance of the curtain airbag cushion 100 cannot be deteriorated even at a temperature in summer, a high humidity condition, or a high concentration of ozone.

Figure 6A:
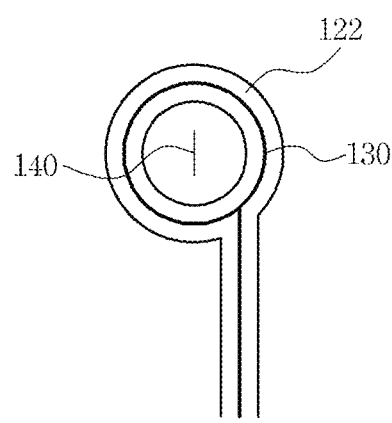
FIG. 6a is a schematic view showing a straight type (−) opening formed in the interior of a second seam-sealed portion.
Figure 6B:
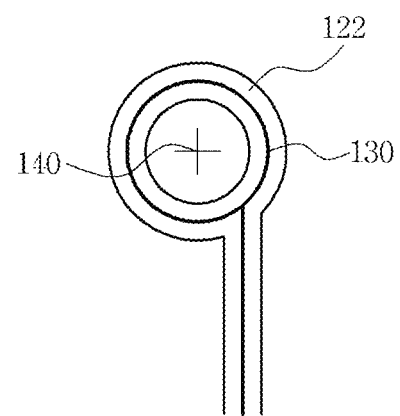
FIG. 6b is a schematic view showing a cross type (+) opening formed in the interior of a second seam-sealed portion.

According to the present invention, the openings 140 are formed inside the second seam-sealed portions 122. If a side crush occurs on the side surface of the vehicle, the gas is injected into the curtain airbag cushion 100 through the operation of the inflator to permit the curtain airbag cushion 100 to be deployed at a fast speed. In this process, the sealants of the second seam-sealed portions 122 may be pushed. So as to prevent such problem from happening, the openings 140 are provided, and FIGS. 6a and 6b show straight type (−) and cross type (+) openings 140. In addition, of course, circular and polygonal openings 140 may be provided.

Hereinafter, the present invention will now be described in detail by way of particular examples. The examples of the present invention are proposed to allow the present invention to be in more detail described, and accordingly, they do not limit the scope of the present invention.

Example 1

A first panel and a second panel, which were made by applying silicone coating liquid (LCF 3600 made by Dow Corning) to the nylon 66 fabric woven with a nylon 66 yarn (having the thickness of 470 Dtex/420 D, break strength of 39.4 N, break elongation of 21.6%, and shrinkage rate of 5.7% at a high temperature), were coupled to each other by means of a silicone sealant (SE 6777 made by Dow Corning) and then sewn by means of a sewing yarn (20M made by AMANN), thereby manufacturing the seam-sealed curtain airbag cushion according to the present invention. The curtain airbag cushion had straight type openings.

Example 2

A first panel and a second panel, which were made by applying silicone coating liquid (LCF 3600C made by Dow Corning) to the PET fabric woven with a PET yarn (having the thickness of 566.5 Dtex/500 D, break strength of 46.2 N, break elongation of 19.3%, and shrinkage rate of 6.9% at a high temperature), were coupled to each other by means of a silicone sealant (SE 6777 made by Dow Corning) and then sewn by means of a sewing yarn (20M made by AMANN), thereby manufacturing the seam-sealed curtain airbag cushion according to the present invention. The curtain airbag cushion had straight type openings.

Comparison Example 1

A seam-sealed curtain airbag cushion was manufactured in the same manner as in Example 1, except the application of the silicone coating liquid to the fabric.

Comparison Example 2

A seam-sealed curtain airbag cushion was manufactured in the same manner as in Example 2, except the application of the silicone coating liquid to the fabric.

Comparison Example 3

A seam-sealed curtain airbag cushion was manufactured in the same manner as in Example 1, except the sewing through the sewing yarn.

Comparison Example 4

A seam-sealed curtain airbag cushion was manufactured in the same manner as in Example 2, except the sewing through the sewing yarn.

The physical properties of the fabrics of the manufactured seam-sealed curtain airbag cushions before and after the application of the coating liquids were evaluated and listed in Tables 1 and 2.

(1) Grams Per Square Meter (g/m²)

Grams of a piece of fabric of 250 mm×250 mm were measured, and the measured grams were divided by the square meter (0.0625 m²) of the piece of fabric, thereby evaluating the grams per square meter.

(2) Thickness (mm)

The thickness of fabric was measured by means of a fabric thickness measurer.

(3) Tensile Strength (kgf/in)

A piece of fabric of 100 mm×300 mm was made, and a force, which was generated when the fabric was cut at a speed of 300 mm/min and at an initial distance (clamp distance) of 75 mm through a UTM (Universal Testing Machine), was measured.

(4) Elongation (%)

When the tensile strength of the fabric was measured, the initial distance of the fabric when the tension starts and the distance of the fabric when the fabric was cut were measured, thereby evaluating the elongation through the following equation.

Elongation=Initial distance/Distance upon cutting×100

(5) Tearing Strength (kgf)

A piece of fabric of 75 mm×200 mm was made, and a force, which was generated when the fabric was cut at a speed of 300 mm/min and at an initial distance (clamp distance) of 75 mm through a UTM (Universal Testing Machine), was measured.

(6) Air Permeability (cfm)

A quantity of air permeated per cubic feet at 125 Pa for one minute was measured (CFM=Cubic feet per min).

TABLE 1

| | | Nylon 66 475Dtex/420D | |
|---|---|---|---|
| Division | | Comparison Example 1 | Example 1 |
| Grams per square meter (g/m²) | | 182.5 | 210.2 |
| Thickness (mm) | | 0.29 | 0.29 |
| Tensile Strength (kgf/in) | Warp | 245.2 | 264.5 |
| | Weft | 250.1 | 278 |
| Elongation (%) | Warp | 38.5 | 43.3 |
| | Weft | 40.2 | 45.6 |
| Tearing Strength (kgf) | Warp | 18.3 | 60.4 |
| | Weft | 18.5 | 58.7 |
| Air Permeability (cfm) | | 1.9 | 0.0 |

TABLE 2

| | | PET 566.5Dtex/500D | |
|---|---|---|---|
| Division | | Comparison Example 2 | Example 2 |
| Grams per square meter (g/m²) | | 251.6 | 276.9 |
| Thickness (mm) | | 0.31 | 0.31 |
| Tensile Strength (kgf/in) | Warp | 270.6 | 297.8 |
| | Weft | 279.0 | 303.9 |
| Elongation (%) | Warp | 37.1 | 42.7 |
| | Weft | 42.7 | 47 |
| Tearing Strength (kgf) | Warp | 13.8 | 28.3 |
| | Weft | 12.8 | 25.1 |
| Air Permeability (cfm) | | 1.9 | 0.15 |

As appreciated from Tables 1 and 2, it was checked that after the coating liquid was applied to the fabric of the curtain airbag cushion, the tearing strength was increased and the air permeability was 0.5 or under.

The physical properties of the fabrics of the manufactured seam-sealed curtain airbag cushions before and after the sewing were evaluated under the conditions of a room temperature, cycling, heat aging, ozone and humidity and then listed in Tables 3 to 6.

TABLE 3

| Fabric Specification | Test Division | | Test Result (kgf) | | |
|---|---|---|---|---|---|
| | | | Mean | Min. | Max. |
| Nylon 66 420D | Tensile Strength | Comparison Example 3 | 50.38 | 47.83 | 53.40 |
| | | Example 1 | 110.93 | 100.13 | 116.95 |
| | Tearing Strength | Comparison Example 3 | 44.85 | 40.41 | 47.93 |
| | | Example 1 | 59.25 | 42.39 | 65.96 |
| PET 500D | Tensile Strength | Comparison Example 4 | 49.22 | 44.35 | 53.39 |
| | | Example 2 | 106.80 | 96.41 | 113.68 |
| | Tearing Strength | Comparison Example 4 | 34.18 | 30.60 | 40.19 |
| | | Example 2 | 55.97 | 49.43 | 63.95 |

TABLE 4

| Fabric Specification | Test Division | | Test Result (MPa) | | |
|---|---|---|---|---|---|
| | | | Mean | Min. | Max. |
| Nylon 66 420D | Tensile Strength | Comparison Example 3 | 52.89 | 45.66 | 59.99 |
| | | Example 1 | 108.43 | 91.31 | 121.87 |
| | Tearing Strength | Comparison Example 3 | 43.49 | 40.21 | 46.61 |
| | | Example 1 | 64.47 | 58.93 | 71.80 |
| PET 500D | Tensile Strength | Comparison Example 4 | 48.94 | 40.40 | 53.27 |
| | | Example 2 | 116.51 | 107.52 | 124.46 |
| | Tearing Strength | Comparison Example 4 | 39.38 | 36.97 | 42.07 |
| | | Example 2 | 55.97 | 47.47 | 61.79 |

TABLE 5

| Fabric Specification | Test Division | | Test Result (MPa) | | |
|---|---|---|---|---|---|
| | | | Mean | Min. | Max. |
| Nylon 66 420D | Tensile Strength | Comparison Example 3 | 48.72 | 46.47 | 52.07 |
| | | Example 1 | 130.92 | 107.12 | 151.34 |
| | Tearing Strength | Comparison Example 3 | 36.84 | 35.34 | 38.86 |
| | | Example 1 | 67.20 | 62.51 | 73.26 |
| PET 500D | Tensile Strength | Comparison Example 4 | 50.22 | 48.48 | 54.22 |
| | | Example 2 | 139.73 | 95.97 | 159.05 |
| | Tearing Strength | Comparison Example 4 | 40.60 | 37.73 | 43.09 |
| | | Example 2 | 63.05 | 52.71 | 69.70 |

TABLE 6

| Fabric Specification | Test Division | | Test Result (MPa) | | |
|---|---|---|---|---|---|
| | | | Mean | Min. | Max. |
| Nylon 66 420D | Tensile Strength | Comparison Example 3 | 58.10 | 51.95 | 62.59 |
| | | Example 1 | 96.38 | 83.81 | 108.55 |

TABLE 6-continued

| Fabric Specification | Test Division | | Test Result (MPa) | | |
|---|---|---|---|---|---|
| | | | Mean | Min. | Max. |
| | Tearing Strength | Comparison Example 3 | 35.51 | 32.45 | 38.38 |
| | | Example 1 | 64.97 | 54.01 | 71.69 |
| PET 500D | Tensile Strength | Comparison Example 4 | 53.51 | 50.91 | 56.33 |
| | | Example 2 | 106.18 | 93.79 | 111.00 |
| | Tearing Strength | Comparison Example 4 | 36.74 | 33.33 | 39.94 |
| | | Example 2 | 56.61 | 50.56 | 64.52 |

As appreciated from Tables 3 to 6, it was checked that when the sewing was carried out after the application of sealant under the respective conditions, on average, the tensile strength was increased by 150% and the tearing strength was increased by 120%, higher than that before the sewing.

The invention claimed is:

1. A seam-sealed curtain airbag cushion comprising a panel to which a coating liquid is applied, a seam-sealed portion, a sewing portion, and openings, wherein the panel is provided by coupling a first panel and a second panel to each other by means of the seam-sealed portion so that the first panel and the second panel are sewn by means of the sewing portion passing through the seam-sealed portion, the panel being made of a polyamide or polyester fabric, and the openings are adapted to release the stress against the internal pressure of the curtain airbag cushion,
- wherein the polyester fabric has weft and warp densities of 49 to 53 EA/in, grams per square meter of 220 to 300 g/m$^2$, tensile strength of 180 kgf/in or more, and tearing strength of 15 kgf or more,
- wherein the polyamide fabric has weft and warp densities of 44 to 48 EA/in grams per square meter of 190 to 240 g/m$^2$, tensile strength of 180 kgf/in or more, and tearing strength of 20 kgf or more,
- wherein the panel to which the coating liquid is applied has an air permeability of 0.15 cubic feet per minute or less, and
- wherein the seam-sealed portion has an application margin of 3 mm or more.

2. The seam-sealed curtain airbag cushion according to claim 1, wherein the coating liquid is a silicone composition.

3. The seam-sealed curtain airbag cushion according to claim 1, wherein the fabric of the panel has the elongation of 25 to 65%.

4. The seam-sealed curtain airbag cushion according to claim 1, wherein the seam-sealed portion has a silicone sealant, and the sealant has an application width of 8 to 18 mm and an application thickness of 0.5 to 1.2 mm.

5. The seam-sealed curtain airbag cushion according to claim 1, wherein the sewing yarn constituting the sewing portion has the thickness of 1260 D or more.

6. The seam-sealed curtain airbag cushion according to claim 1, wherein under a room temperature condition, the tensile strength is increased by 150% and the tearing strength is increased by 120%, higher than before the sewing.

7. The seam-sealed curtain airbag cushion according to claim 1, wherein under a first cycling condition, the tensile strength is increased by 150% and the tearing strength is increased by 120%, higher than before the sewing, and the first cycling condition is as follows: a) Twenty four hours elapse at a temperature of 38° C. and humidity of 95%; b) Twenty four hours elapse at a temperature of 80° C.; c) Six hours elapse at a temperature of 29° C.; and d) The above processes are repeated two times.

8. The seam-sealed curtain airbag cushion according to claim 1, wherein under a second cycling condition, the tensile strength is increased by 150% and the tearing strength is increased by 120%, higher than before the sewing, and the second cycling condition is as follows: a) Twenty nine hours elapse at a temperature of −40° C.; b) Nineteen hours elapse at a temperature of 22° C. and humidity of 95%; c) Twenty nine hours elapse at a temperature of 107° C.; d) Nineteen hours elapse at a temperature of 22° C. and humidity of 95%; and e) The above processes are repeated two times.

9. The seam-sealed curtain airbag cushion according to claim 1, wherein under a heating aging condition, the tensile strength is increased by 150% and the tearing strength is increased by 120%, higher than before the sewing, and the heating aging condition is as follows: Four hundred eight hours elapse at a temperature of 108° C.

10. The seam-sealed curtain airbag cushion according to claim 1, wherein under an ozone condition, the tensile strength is increased by 150% and the tearing strength is increased by 120%, higher than before the sewing, and the ozone condition is as follows: Fourteen days elapse at an ozone gas concentration of 0.5 ppm and a temperature of 38° C.

11. The seam-sealed curtain airbag cushion according to claim 1, wherein under a humidity condition, the tensile strength is increased by 150% and the tearing strength is increased by 120%, higher than before the sewing, and the humidity condition is as follows: Four hundred eight hours elapse at a temperature of 70° C. and humidity of 95%.

* * * * *